H. R. MASON.
HOSE COUPLING.
APPLICATION FILED AUG. 31, 1907.
919,743.
Patented Apr. 27, 1909.
Fig. 1.
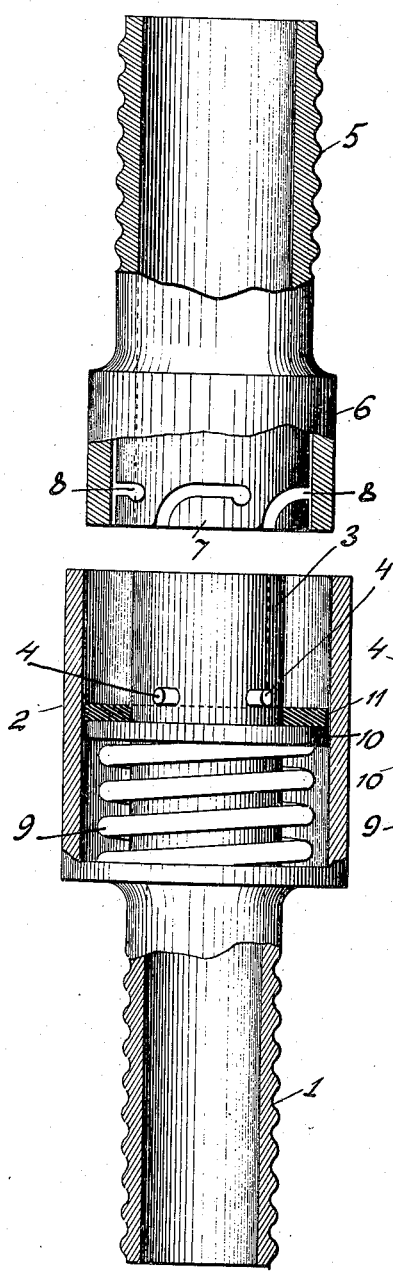
Fig. 2.
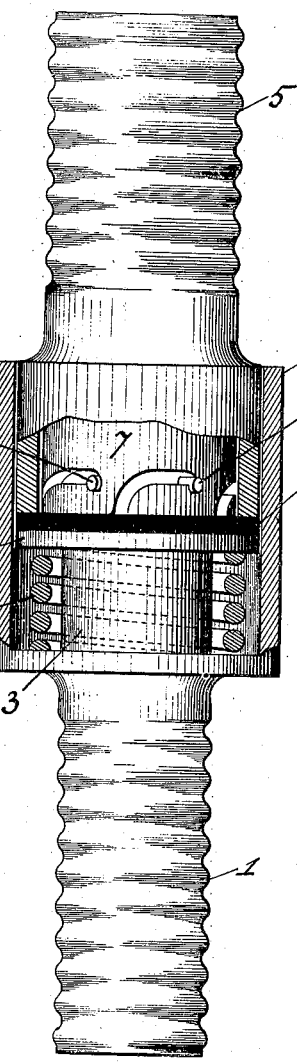
Fig. 3.
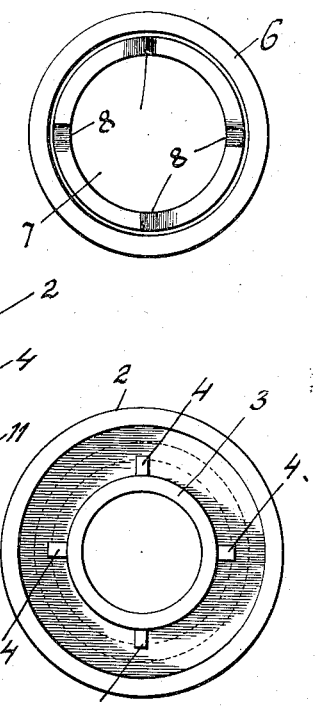
Fig. 4.
Witnesses
A. H. Rabsag,
O. H. Butler.
Inventor
H. R. Mason
By
H. C. Everett & Co.
Attorneys

UNITED STATES PATENT OFFICE.

HOMER RHEA MASON, OF WILKINSBURG, PENNSYLVANIA.

HOSE-COUPLING.

No. 919,743.  Specification of Letters Patent.  Patented April 27, 1909.

Application filed August 31, 1907. Serial No. 390,902.

*To all whom it may concern:*

Be it known that I, HOMER RHEA MASON, a citizen of the United States of America, residing at Wilkinsburg, in the county of Allegheny and State of Pennsylvania, have invented certain new and useful Improvements in Hose-Couplers, of which the following is a specification, reference being had therein to the accompanying drawing.

This invention relates to hose couplings, and its object is to provide an effective and inexpensive device for readily connecting and disconnecting sections of hose.

The construction of the improvement will be fully described hereinafter, in connection with the accompanying drawing, which forms a part of this specification, and its features of novelty will be set forth in the appended claim.

In the drawing, Figure 1 is a view partly in vertical section, and partly in elevation of a coupling embodying the invention, with the two members of the coupling separated, Fig. 2 is a similar view with the coupling members connected, Fig. 3 is an end elevation of one of the coupling members, and Fig. 4 is a similar view of the other coupling member.

One of the coupling members herein termed the female member comprises an externally-corrugated pipe 1, provided with an integral sleeve 2. The pipe 1 is formed with an extension 3 provided with a plurality of equidistant pins 4, said extension corresponding in length to the sleeve 2 and extending therethrough. The other coupling member herein termed the male member comprises an externally-corrugated pipe 5 having an integral sleeve 6 of less diameter than the sleeve 2 and adapted to fit therein. The portion 7 of the pipe 5 extending within the sleeve 6 is formed with a plurality of bayonet slots 8 corresponding in number to the pins 4. The tubular extension 3 is encircled by a coil-spring 9, and a metallic washer 10. Against the washer 10 is a flexible or yielding gasket 11.

The utility and operation of the improved coupling will be readily understood. To the corrugated pipes 1 and 5 are secured the hose sections to be connected, after which the sleeve 5 is inserted into the sleeve 2 to engage the bayonet slots 8 with the pins 4. The partial rotation of the two coupling members securely engages them against the tension of the spring 9 and the washer 10. The yielding packing 11 insures a water-tight connection, and it is obvious that the coupling members may be quickly connected and disconnected.

It will be understood that the invention is not restricted to the specific construction here shown, but includes all such modifications and variations in the details of construction as may fall within the terms and scope of the following claim.

Having now described my invention what I claim as new, is:—

A hose coupling embodying a male and a female member, said male member comprising a pipe section having formed integral therewith a sleeve, said sleeve surrounding a part of said pipe section, that portion of the pipe section exteriorly of said sleeve being corrugated and that portion surrounded by the sleeve provided with a series of radially extending pins, the outer end of said sleeve being closed, a gasket surrounding the pipe section between the pins and the closed end of the sleeve, a washer seated against the gasket, a spring surrounding the pipe section between said washer and the closed end of said sleeve, said female member comprising a pipe section fitting over that portion of the male member inclosed by the sleeve thereof, that portion of the pipe section fitting over the portion of the male member provided with bayonet slots to receive said pins for coupling the two members together, said female member having a sleeve surrounding that portion of the pipe section provided with bayonet slots, said sleeve fitting within the sleeve of the male member and having its free end in engagement with said gasket, said sleeve of the female member of a length as to constitute a means for compressing the spring within the sleeve of the male member and to hold said sleeve under a state of compression when the pins are interlocked with the slots whereby the said male and female sections will be maintained coupled, that portion of the female section exteriorly of the sleeve of said section being corrugated, the sleeve of the female section having its inner end flush with the inner end of the pipe section of said member and the sleeve of the male member having its inner end flush with the inner end of the pipe section of said member, said sleeve of the female member having a closed outer end adapted to be flush with the open end of the sleeve of the male member when the said members are coupled together.

In testimony whereof I affix my signature in the presence of two witnesses.

HOMER RHEA MASON.

Witnesses:
 MAX H. SROLOVITZ,
 C. V. BROOKS.